Feb. 11, 1930.  C. F. SMITH  1,746,718
BRAKE TESTING APPARATUS
Filed May 1, 1926   3 Sheets-Sheet 2

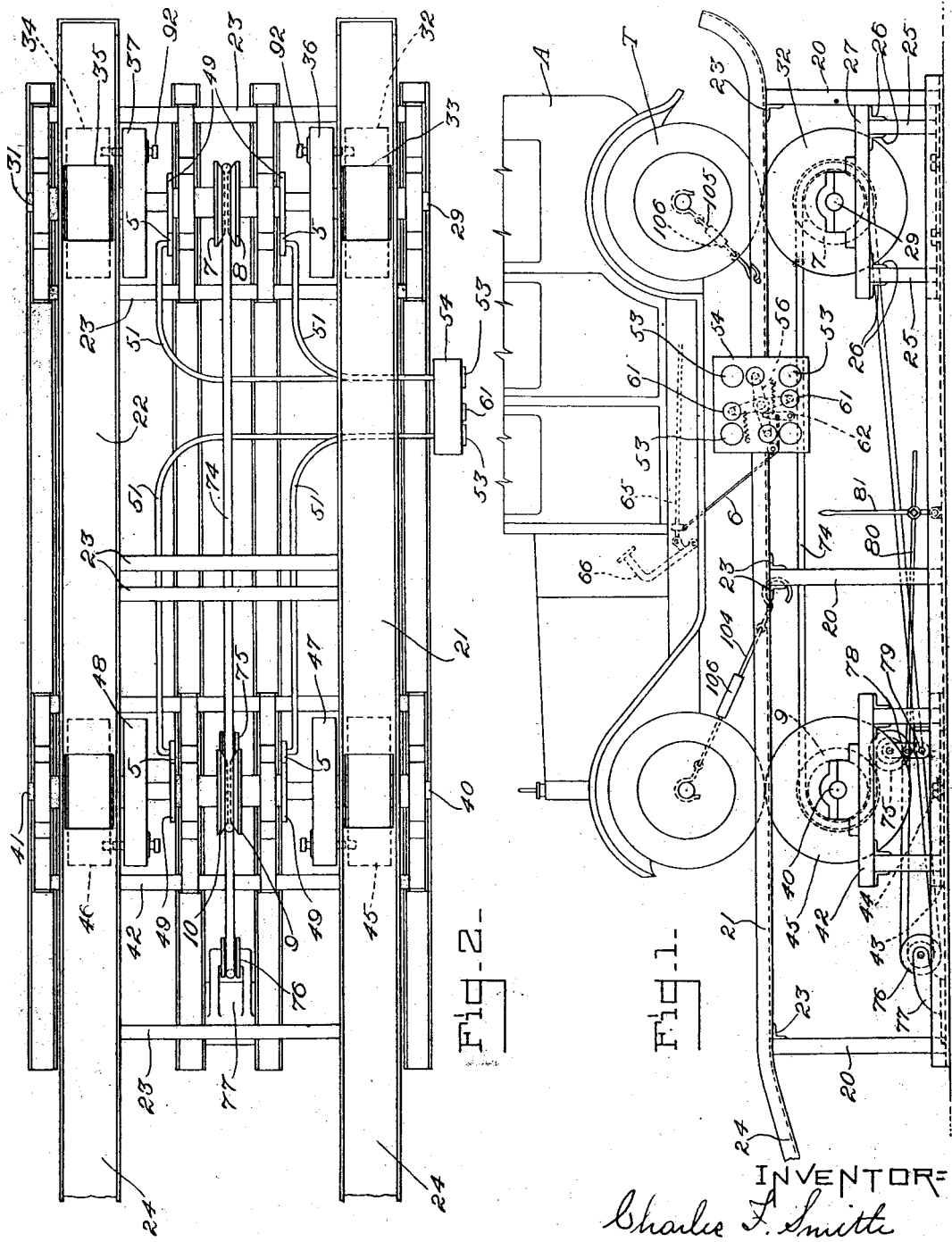

INVENTOR=
Charles F. Smith
by Macleod Calver Copeland & Shea
ATTORNEYS

Feb. 11, 1930.       C. F. SMITH       1,746,718
BRAKE TESTING APPARATUS
Filed May 1, 1926        3 Sheets-Sheet 3

INVENTOR=
Charles F. Smith
BY Macleod Calvin Copeland & The
ATTORNEYS

Patented Feb. 11, 1930

1,746,718

UNITED STATES PATENT OFFICE

CHARLES F. SMITH, OF BOSTON, MASSACHUSETTS, ASSIGNOR, BY DIRECT AND MESNE ASSIGNMENTS, TO BRAKE SYNCHROMETER CO., OF BOSTON, MASSACHUSETTS, A CORPORATION OF MASSACHUSETTS

BRAKE-TESTING APPARATUS

Application filed May 1, 1926. Serial No. 105,969.

This invention has for its purpose the provision of an apparatus or machine for testing the efficiency of brakes in automotive vehicles, and for enabling the brakes to be accurately and properly synchronized. An object of the invention is to provide a practicable, convenient and efficient apparatus or machine particularly adapted for carrying out the foregoing purposes wherein the apparatus is relatively simple and durable in construction, and adapted for testing the brakes of various types of cars in a relatively short space of time.

The device embodying my invention measures the effectiveness of the brakes by measuring the time which they require to bring to a standstill a series of flywheels or rotors which are in contact with the vehicle wheels, the combined momentum of said flywheels being substantially equal to the momentum of the car at any given speed.

In carrying out the present invention, the vehicle is run on to a suitable platform or elevated ways into operative position with respect to the apparatus, and the wheels, such as the rear driving wheels of the vehicle, are supported on flywheels or rotors which are rotatable by the wheels of the vehicle, and acquire a momentum by the measurement of which the braking action on each of the wheels of the vehicle may be tested and ascertained. Adapted to be connected to and disconnected from each of the flywheels and operated thereby is a tachometer which is connected to the flywheel, upon putting on the brakes, and thus indicates the distance traversed or the movement of the vehicle wheels during the braking action thereon. In this way, the distance travelled from the commencement of the braking action until the vehicle wheels cause rotating is determined for each wheel. It is important that the speed of the vehicle wheels at the commencement of the test be equalized, that is, revolve at the same number of revolutions per minute, or in other words, if it is desired to test the braking efficiency when the car is travelling thirty miles per hour, it is important that all the wheels of the vehicle at the beginning of the test revolve each of the several flywheels at the same rate of speed. In the present embodiment of my invention the front wheels of the testing device are driven frictionally from the rear wheels, and the speed of rotation of all the wheels is synchronized by means of a friction device between the rear flywheels as will be hereafter explained. Thus, when the engine is running and one of the vehicle wheels rotates, for instance, at thirty miles an hour and the other at thirty-two miles per hour, the equalizing mechanism will reduce the speed of the wheels and flywheels to thirty miles an hour. Mechanism is also provided for connecting automatically a tachometer to each of the flywheels or rotors when the brake of the vehicle is operated to measure the number of revolutions of each wheel which occur before the brake brings the respective wheels to a standstill. The speed of rotation of each flywheel during the testing operation is independently indicated in miles per hour, and the travel of the flywheels or the distance traversed to bring the car to a stop is indicated for each flywheel and at a common point, so that all of the readings at the commencement and completion of the test for all the vehicle wheels may be readily taken at a single point.

Other objects of this invention appear in the following description and appended claims, reference being had to the accompanying drawings forming a part of this specification wherein like reference characters designate corresponding parts in the several views and wherein:

Fig. 1 is a side elevation illustrating an embodiment of my improved apparatus and an automobile in position for testing the brakes thereof.

Fig. 2 is a plan view of the apparatus.

Figure 3:
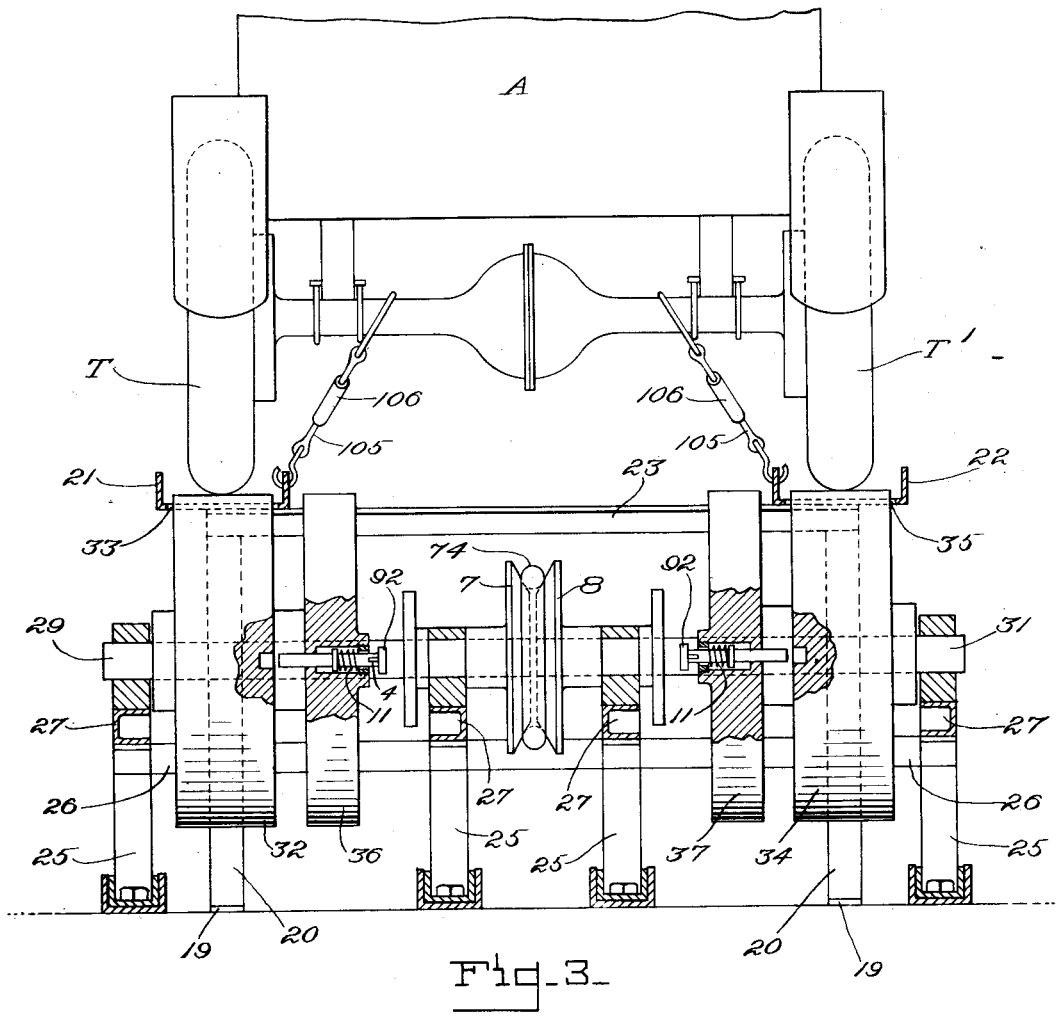
Fig. 3 is a rear end elevation partly in section of the structure shown in Fig. 1.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I amploy is for the purpose of description and not of limitation.

In the drawings I have herein illustrated a present preferred form of my invention as embodied in a device for testing vehicle having front wheel brakes. The apparatus as shown comprises suitable base plates 19 upon which are supported a plurality of columns or uprights 20 carrying a pair of spaced ways 21 and 22, this construction forming an elevated platform upon which an automobile or other vehicle A may be supported. The ways 21 and 22 are connected by means of cross members 23 and the car is driven on to the platform by means of inclined runways 24.

Supported beneath the ways 21 and 22 at the rear end thereof is a platform comprising uprights or columns 25 connected together by means of transverse beams 26 and mounted upon the latter are a plurality of longitudinal beams 27, there being four shown in the present construction. Supported in suitable bearings on one pair of beams 27 is a transverse shaft 29 which terminates substantially midway between the opposite ways 21 and 22. In alinement with the shaft 29 and spaced endwise therefrom is a second shaft 31 which is supported in suitable bearings carried by another pair of beams 27. The shafts 29 and 31, therefore, extend in alinement but are unconnected so as to be independently rotatable. Mounted on the shaft 29 and fixed thereto is a flywheel 32 which projects a suitable distance through a slot or opening 33 in the supporting way 21. Mounted on the shaft 31 at the opposite side of the platform is a flywheel 34 which also projects through a slot 35 in the supporting way 22. From this construction it will be seen that when the vehicle is run on to the ways 21 and 22, the rear wheels T and T' may be entirely supported on the flywheels 32 and 34 and therefore the latter will be rotated from the vehicle wheels. Mounted on the shafts 29 and 31 and adjacent the flywheels 32 and 34 are a pair of supplementary flywheels 36 and 37, respectively, the purposes of which will be hereinafter described.

Figure 4:
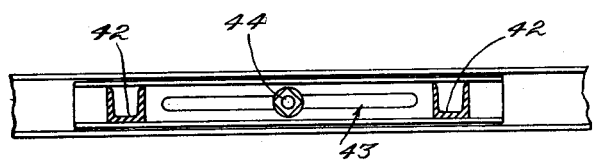
Fig. 4 is a detail of the adjusting device for the front wheel drive.
Figure 6:
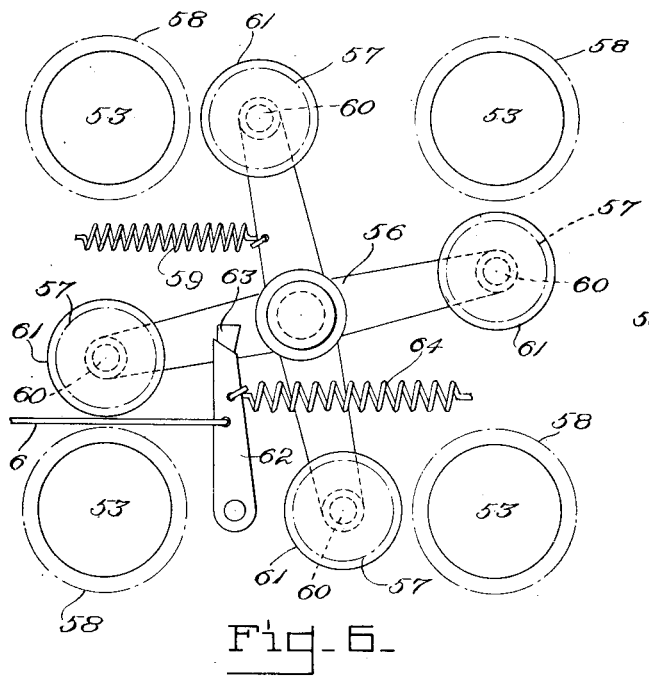
Figs. 6 and 7 show the two positions of the mechanism for connecting the four tachometers to the speedometers co-incidentally with the actuation of the brakes.

At the front end of the device are located two shafts 40 and 41 supported on a frame 42, see Fig. 1, which is similar to the frame already described which supports the two rear flywheels 32 and 34. This frame 42 is, however, adjustable lengthwise of the vehicle to adapt the device to vehicles of different wheel base. Any convenient adjustment can be employed. In the drawings, I have shown the uprights of the frame 42 mounted in slotted members 43, one of which is shown in Fig. 4, and bolts 44 by means of which the slotted members 43 may be clamped in the desired position of adjustment. The two shafts 40 and 41 carry flywheels or rotors 45 and 46 correspondingly arranged to the flywheels at the rear of the device. I also have provided auxiliary flywheels 47 and 48 for purposes which will hereinafter be described.

Figure 8:
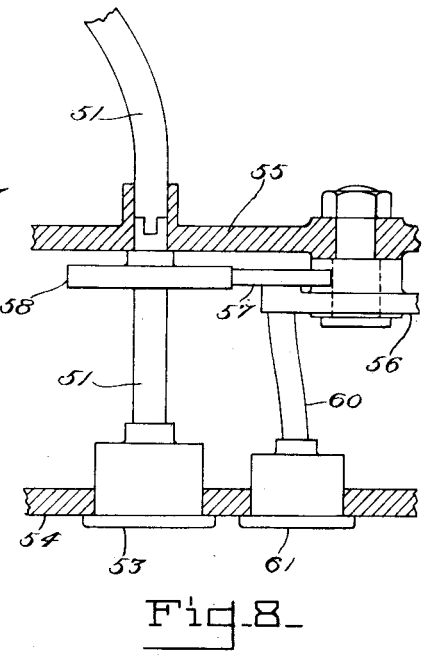
Fig. 8 is a section on line 8—8, Fig. 7.
Figure 7:
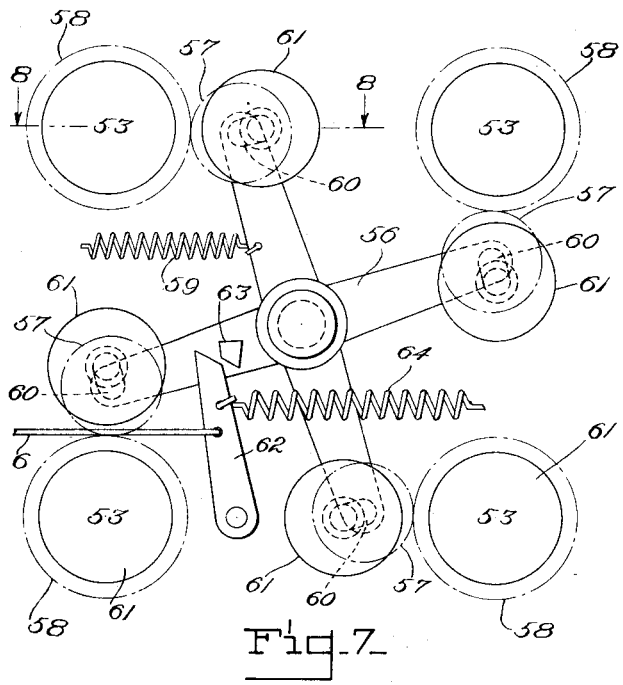
Figure 5:
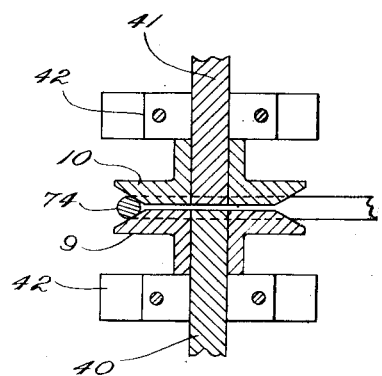
Fig. 5 is a section of the equalizing mechanism for the driving wheels.

To each of the shafts 29, 31, 40 and 41 are connected gears 49 which mesh with gears 5 connected to flexible shafts 51. These flexible shafts drive speedometers 53, there being one speedometer for each wheel of the vehicle. The speedometers are conveniently assembled on an instrument board 54, see Figs. 1 and 2, on the side of the device. Pivotally mounted on a suitable plate 55, see Fig. 8, which plate is located behind the instrument board 54 is a four-armed spider 56, each arm of which carries a friction disk 57. The friction disks 57 contact with friction pulleys 58 mounted on the speedometer shafts 51 so that the small friction disks 57 will be driven by the friction disks 58 whenever they are in contact with them. A spring secured to one arm of the spider 56 tends to hold the spider in position to cause the friction disks on the spider arms to contact with the friction disks on the speedometer shafts. Each small friction disk 57 is connected by a flexible shaft 60 to a tachometer head 61 located on the instrument board 54.

The friction disks 57 on the spider 56 are held out of contact with the cooperating friction disks 58 by a latch 62 cooperating with a lug 63 on the spider. The latch 62 is normally held against the lug 63 by a spring 64 which is stronger than the spring 59 and therefore normally holds the friction disks out of contact. The latch 62 is connected during the test by a cable 6 with a brake operating mechanism as, for instance, with a brake rod 65 operated by the brake lever 66. This construction is such that when the brake lever 66 is depressed to apply the brakes the latch 62 releases the spider 56 and the spring 59 pulls the four small friction disks 57 into contact with the friction disks 58 on the speedometer device so that thereafter the tachometers 61 are operated. It will thus be seen that the mechanism just described registers the speed in miles per hour at which the vehicle would be travelling if it were on the road instead of on the four flywheels and that the tachometers record the number of revolutions or, if so calibrated, the number of feet which the vehicle wheels move after the brakes have been applied.

If the device is to be used to test the braking power of a vehicle equipped with front wheel brakes it is preferable that the two front flywheels 45 and 46 be given a momentum equal to the momentum of the flywheels which are actuated by the rear wheels of the vehicle. Since the front wheels of the vehicle are not themselves power driven I apply power from the rear shafts 29 and 31 in the following manner: On the proximate ends of the shafts 29 and 31 are placed halves of a grooved pulley. These halves are designated 7 and 8 and are spaced apart enough so that there will be no frictional contact between their adjacent faces or the ends of the shafts. A similar grooved pulley made in two pieces 9 and 10 is applied to the proximate ends of the front shafts 40 and 41. Around these pulleys runs an endless belt 74, conveniently a rope, and this also passes around two idle pulleys 75 and 76, the latter of which is secured to a bracket 77 on a fixed part of the machine. The idle pulley 75 is mounted on the upper end of a lever 78 pivoted at 79 to the adjustable carriage 42 and is connected by a rod 80 to a hand lever 81 by means of which the pulley 75 may be moved to tighten or loosen the belt 74. From the foregoing it will be seen that the rear wheels T and T' of the vehicle to be tested drive the flywheels 32 and 34 and that the belt 74 drives the front shafts 40 and 41 and consequently the front flywheels 45 and 46. It will also be seen that friction of the belt on the several pulleys tends to equalize the speeds of each of the pulleys and maintain them uniform and equal.

It will be understood that the flywheels 32, 34, 45 and 46 will have sufficient weight for vehicles up to a predetermined weight. For vehicles of a greater weight, the weight of the flywheels 32, 34, 45 and 46 may be increased by connecting thereto the supplementary flywheels 36, 37, 47 and 48 respectively. This is accomplished by means of locking pins 92 as shown in Fig. 3. Each locking pin extends freely through a bore in one of the supplementary flywheels and when released is forced into position by a spring 11 to lock the supplementary flywheel to the adjacent main flywheel. As shown in Fig. 3, the locking pin may be withdrawn from locking engagement with the main flywheel against the action of the spring 11 and held in this position by turning the locking pin so that the shoulder or projection 4 carried thereby will engage and be retained against the face of the supplementary flywheel.

In using the present invention for testing the brakes of a vehicle or automobile having front wheel brakes, the car is driven onto the ways 21, 22 so that its rear whels T and T¹ will be supported entirely upon the flywheels 32 and 34. The front wheels rest on the flywheels 45 and 46, the frame 42 being adjusted longitudinally to suit the wheelbase of the car, and the belt 74 is tightened by the lever 81. The vehicle is held in fixed position by means of anchor cables 104 and 105 which connect the axles of the wheels to the stationary platform, these cables being adjustable by means of turn buckles 106. The cable 6 is connected to the brake operating mechanism of the car. The engine of the car is then started, thereby driving the wheels T and T¹, and they frictionally drive the flywheels 32 and 34 at the same speed. The front flywheels are driven by the belt 74. The speed of rotation of each flywheel is independently indicated by means of one of the speedometers, and in case one of the flywheels, and hence one of the vehicle wheels, rotates at a different speed than the other, the frictional engagement of the equalizing mechanism which in the form of my device shown in the drawings is composed of the split grooved pulley and the rope causes all the flywheels to acquire a uniform speed. When all the flywheels rotate at the same predetermined speed, the lever 81 is pushed forward loosening the belt 74 and allowing all the wheels to run independently of each other since the rope is ineffective unless drawn tight into the pulleys. Then the clutch of the car is thrown out disconnecting the engine, the brake pedal 16 is depressed and the brakes applied. The movement of the brake pedal also releases the latch 62 and the spring 59 moves the spider 56 and brings the friction disks 57 and 58 into contact with each other so that the tachometers 61 will be set in motion. Each tachometer will register or indicate the travel of each vehicle wheel during the braking action either in revolutions or feet according to the calibration of the instrument. From these readings the brakes for each wheel may be readily adjusted so as to synchronize the same. In addition, the readings of the tachometers will indicate the distance which the vehicle will travel until brought to a position of rest by the action of the brakes, the speedometers indicating the speed of the vehicle at the commencement of the braking action. It will be understood that by virtue of the connections between the tachometers and the brake rods of the vehicle, the tachometers will be disconnected from the speedometer shafts 51 when the brakes are released. It will also be understood that if the vehicle is heavier than a predetermined amount the supplementary flywheels will be connected to the main flywheels. If the car to be tested is equipped with rear wheel brakes only, the belt 74 of the equalizing mechanism is drawn taut by lever 81, so that the belt also acts to equalize the speed of the two rear flywheels, when this is done and the wheels are at the desired speed, the lever 81 is pushed forward loosening the belt 74 so that the rear wheels no longer drive the front flywheels, and are free from each other because the belt is effective as an equalizer only when taut. The front flywheels thereafter have no perceptible effect on the action of the device. Thereafter the car clutch is released, and the brakes applied as described already. The instruments will then show the speed of the wheels and the relative braking effect of the brakes on the two rear wheels.

It is to be understood that by describing in detail herein any particular form, structure, or arrangement, it is not intended to limit the invention beyond the terms of the several claims or the requirements of the prior art.

While in the foregoing description I have described my device as being actuated by the engine of the vehicle to be tested the energy being transmitted from the rear wheels frictionally to the flywheels, I do not limit myself to this mode of operation of my device, since it will be apparent that any source of power may be employed to impart to the flywheels the kinetic energy equal to that of the car in motion at a given speed, the essential being that when the desired amount of kinetic energy has been imparted to the flywheels the brakes on the vehicle be employed to stop the rotation of the flywheel and measurements be made of the amount of rotation which takes place after the brakes are applied.

What I claim is:

1. In a brake testing apparatus for vehicles having wheels and brakes therefor, the combination of a plurality of flywheels, means for supporting them for rotation in harmony with said vehicle wheels, separable connections between two or more of the flywheels, and means for measuring the deceleration of each flywheel and its associated vehicle wheel after the brakes have been applied and the flywheels disconnected from each other.

2. In an apparatus of the class described, the combination with a pair of flywheels adapted to receive kinetic energy from and adapted for connection to the wheels of the vehicle to be tested so as to be stopped by the vehicle wheel brakes, equalizing means to equalize the speed of said flywheels, means for rendering said equalizing means inoperative, and separate measuring means for measuring the movement of each flywheel after the brakes have been applied.

3. In an apparatus of the class described, a pair of flywheels receiving kinetic energy, a second pair of flywheels connected with the first mentioned pair of flywheels, all of said flywheels being connected with the wheels of the vehicle to be tested so as to be stopped by the vehicle wheel brakes, means to disconnect the driving connections between the said flywheels and separate measuring means for measuring the movement of each flywheel after they have been thus disconnected and the brake has been applied to the vehicle in contact therewith.

4. In a brake testing apparatus, the combination of a pair of independently rotatable shafts located in alinement, friction equalizing means between the shafts, means for rendering the equalizing means inoperative, a flywheel on each shaft and adapted to be driven in harmony with a vehicle wheel, means operatively connected to each of said shafts for indicating the speed of rotation of each vehicle wheel, and means operatively connected to each shaft for indicating the travel of each vehicle wheel during a braking action thereon.

5. In a brake testing apparatus, the combination of a pair of independently rotatable shafts located in alinement, a flywheel on each shaft and in position to be driven coincidentally with a vehicle wheel, means operatively connected to each of said shafts for indicating the speed of rotation of each vehicle wheel, indicating means adapted to be operatively connected to each shaft for indicating the travel of each vehicle wheel during a braking action thereon, and means adapted to be connected to the vehicle brake for controlling the connection of said indicating means to the shaft.

6. In a brake testing apparatus, the combination of a platform for supporting a vehicle, means for securing the vehicle in fixed position on the platform, a plurality of independently rotatable flywheels supported below said platform and projecting above the same to engage and to be driven from said vehicle wheels, equalizing means for equalizing the speed of said flywheels and the vehicle wheels, means for rendering the equalizing means inoperative, means for indicating the speed of rotation of the vehicle wheels, and means for measuring the travel of the vehicle wheels during a braking action thereof.

7. In an apparatus for testing brakes for vehicle wheels, the combination of a pair of flywheels each adapted to be frictionally driven from a vehicle wheel, an equalizing member connected with each flywheel, means for connecting and disconnecting the same to equalize the speed of rotation of the flywheels, means for separately indicating the speed of rotation of each flywheel, and means for separately indicating the travel of the flywheels during a braking action on the vehicle wheels.

8. In a brake testing apparatus for a vehicle having a wheel and a brake therefor, the combination of a set of flywheels, means for supporting the same in position to be rotated with said vehicle wheel, means for connecting and disconnecting one flywheel from another, a speedometer and a tachometer driven from one of the flywheels, and means for controlling the operation of the tachometer.

9. The combination of a pair of independently rotatable flywheels, means for supporting the same to be driven in harmony with a pair of vehicle wheels, means for equalizing the speed of rotation of said flywheels, means for rendering said equalizing means inoperative, and means adapted to be rendered operative by the brake applying means to the vehicle wheels for indicating the effectiveness of the braking action.

10. The combination of a pair of independently rotatable flywheels, means for supporting the same in frictional engagement with a pair of vehicle wheels, means for equalizing the speed of rotation of said flywheels, means for rendering said equalizing means inoperative, and means adapted to be rendered operative by the brake applying means to the vehicle wheels for separately measuring the braking action on each wheel.

11. In a brake testing apparatus, the combination of a pair of independently rotatable shafts located in alinement, a flywheel for rotating each shaft and located in position to support a vehicle wheel and driven therefrom, a friction member carried by each shaft, an intermediate friction member to equalize the speed of rotation of the vehicle wheels, means for rendering said equalizing means inoperative, a speedometer and a tachometer driven from each of said first shafts, and means for automatically controlling operation of each tachometer from the vehicle brake.

12. The combination of a pair of independently rotatable flywheels, means for supporting the same in position to be driven coincidentally with a pair of vehicle wheels provided with brakes, alined shafts for said flywheels, complementary and independent pulley members on the proximate ends of said shafts, a belt contacting with both of said pulley members to equalize the speed of rotation of said flywheels, means for rendering the equalizing means inoperative, and means operative upon applying a braking action to the vehicle wheels for measuring separately the braking action on each wheel.

13. In a vehicle brake testing machine, a plurality of independently rotatable rotors adapted severally for rotation in frictional contact with the corresponding wheel of the vehicle to be tested and capable of receiving kinetic energy sufficient for the purposes of the test, said rotors moving solely by said kinetic energy during the test, and means for measuring the movement of each rotor after the brakes have been applied to the vehicle.

14. The method of testing vehicle brakes which consists in applying power to rotate the wheels of the vehicle while they are severally in energy transmitting relation with separate rotors to store kinetic energy in the wheels and rotors, disconnecting the power from the wheels and rotors, applying means for equalizing the speed of the wheels and rotors, disconnecting the equalizing means, applying the brakes and measuring the deceleration of each wheel and rotor after the brakes have been applied.

15. In a vehicle brake testing machine, a plurality of independently operable means for storing kinetic energy, each means including a rotor adapted for rotation in frictional contact with a corresponding wheel of the vehicle and being capable of receiving kinetic energy sufficient for the purpose of the subsequent test, during which the means is impelled solely by said stored energy, and means for measuring the movement of the energy-storing means after the brakes have been applied to the vehicle.

16. In an apparatus for testing the brakes of vehicle wheels, the combination of a pair of flywheels each adapted to be frictionally driven from a vehicle wheel, an equalizing member connected with each flywheel, means for frictionally connecting and disconnecting the same to equalize the speed of rotation of the flywheels, means for indicating the speed of rotation of the flywheels, and means controlled by the operation of the vehicle brakes for indicating the travel of the flywheels during a braking action on the vehicle wheels.

17. An apparatus for testing wheel-brakes comprising a pair of heavy testing-wheels upon which the wheels carrying the brakes to be tested are adapted to be mounted for rotation by said testing-wheels, separate shafts for said testing-wheels, means connecting said shafts by which the testing-wheels will be caused to turn in unison, and means for disengaging said connecting means.

18. An apparatus for testing wheel-brakes comprising a pair of heavy testing-wheels upon which the wheels carrying the brakes to be tested are adapted to be mounted for rotation to move proportionately to said testing-wheels when the latter are set in motion, separate shafts for said testing-wheels, a clutch connecting said shafts whereby the testing-wheels will be caused to turn in unison, means for disengaging the clutch, a registering device, and means whereby said device is controlled to move proportionately to the shafts and testing-wheels for indicating the decreasing momentum and registering the number of revolutions of the brake-wheels, respectively, as said brake-wheels and testing-wheels come to rest after the application of the brakes.

19. An apparatus for testing wheel-brakes comprising a pair of testing-wheels upon which the wheels carrying the brakes to be tested are adapted to be mounted for rotation thereby, separate shafts for said testing-wheels, a clutch connecting said shafts by which the testing-wheels will be caused to turn in unison, and means for releasing the clutch, together with a registering device, means whereby said device is controlled to move proportionally to the shafts and testing-wheels to indicate the decreasing momentum and register the number of revolutions of said testing wheels in coming to rest after the application of the brakes, said means comprising levers connected together for movement in unison and friction-wheels carried by the levers for movement thereby in and out operative position, means for holding the levers with the friction-wheels normally out of operation, and means for releasing the clutch and levers simultaneously.

20. In a brake testing apparatus for vehicles having wheels and brakes therefor, the combination of a plurality of flywheels, means for supporting them for rotation in constant relation with said vehicle wheels, and separable connections between two or more of the flywheels.

21. The method of testing the individual brakes of a vehicle having a pair or more wheels to which brakes are applied, said method consisting in applying power to rotate the brake wheels of said vehicle while each of the wheels, the brakes of which are being tested, are in energy transmitting relation with a rotor to store kinetic energy in the wheels and rotor, applying the brakes and then measuring separately the deceleration of each braked wheel.

In testimony whereof I affix my signature.

CHARLES F. SMITH.